United States Patent [19]

Hesener et al.

[11] Patent Number: 5,564,801
[45] Date of Patent: Oct. 15, 1996

[54] COMBINATION SYSTEM FOR HOLDING BOXED COMPACT DISKS

[76] Inventors: Walter Hesener, 66 rue de la Prulay, CH-1217 Meyrin-Genève, Switzerland; Ursula Hesener, Via delle Souole, 1, CH-6906 Lugano-Cassarate, Switzerland

[21] Appl. No.: 331,539

[22] Filed: Mar. 2, 1995

[51] Int. Cl.⁶ .................................................. A47B 81/06
[52] U.S. Cl. ........................ 312/9.63; 211/40; 312/9.44
[58] Field of Search ..................................... 312/118, 119, 312/9.41, 9.42, 9.43, 9.44, 9.45, 9.46, 9.53, 9.56, 9.63, 234, 234.1, 111, 265.5; 206/387, 387.15; 211/40, 41; 40/152

[56] References Cited

U.S. PATENT DOCUMENTS

| | | |
|---|---|---|
| 1,161,762 | 11/1915 | Bartlett . |
| 3,523,382 | 8/1970 | Dreyer . |
| 3,883,926 | 5/1975 | Reynolds . |
| 4,543,759 | 10/1985 | Rohrer . |
| 4,697,774 | 10/1987 | Sarton et al. . |
| 4,706,397 | 11/1987 | Hesener . |
| 4,912,863 | 4/1990 | Harvey . |
| 4,919,287 | 4/1990 | Haskett et al. . |
| 5,040,687 | 8/1991 | Whittington . |
| 5,050,734 | 9/1991 | Chen . |
| 5,172,817 | 12/1992 | Gross . |
| 5,250,001 | 10/1993 | Hansen . |
| 5,267,403 | 12/1993 | Hesner . |
| 5,269,083 | 12/1993 | Vampatella et al. . |

*Primary Examiner*—Peter M. Cuomo
*Assistant Examiner*—Gerald A. Anderson
*Attorney, Agent, or Firm*—Keck, Mahin & Cate

[57] ABSTRACT

The combination system for holding compact disk boxes includes combination plates (1) which can be joined together by linear and angled connecting strips (3,3') fastened on their rear sides to form flat and cuboid combinations for holding and displaying CD boxes. On a front side, a combination plate (1) has a rectangular mounting area (1b) used to hold a CD box (2) which is secured in place by means of an angled projection (1d) and a snap-catch (1e) so that a compact disk (5) can be removed without displacing the CD box (2). Magazines (30) can be inserted for additional storage of CD boxes (2).

10 Claims, 4 Drawing Sheets

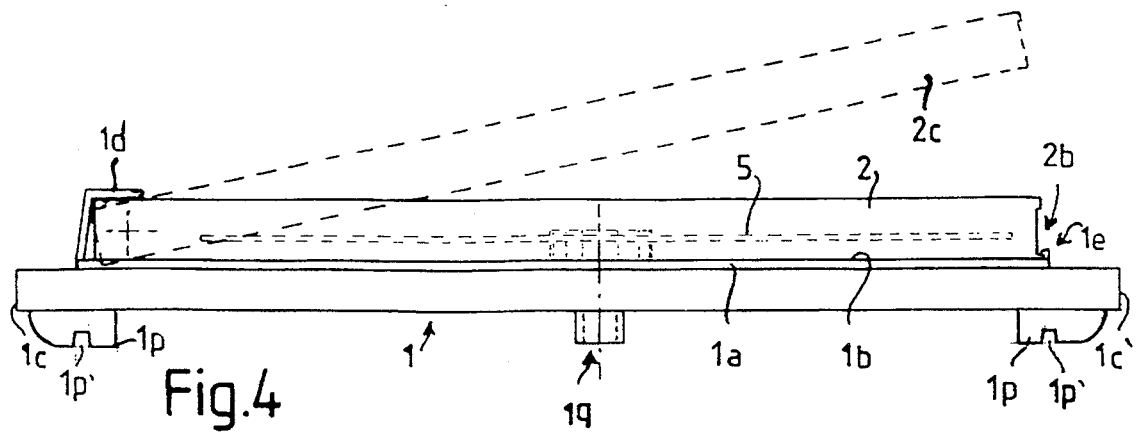
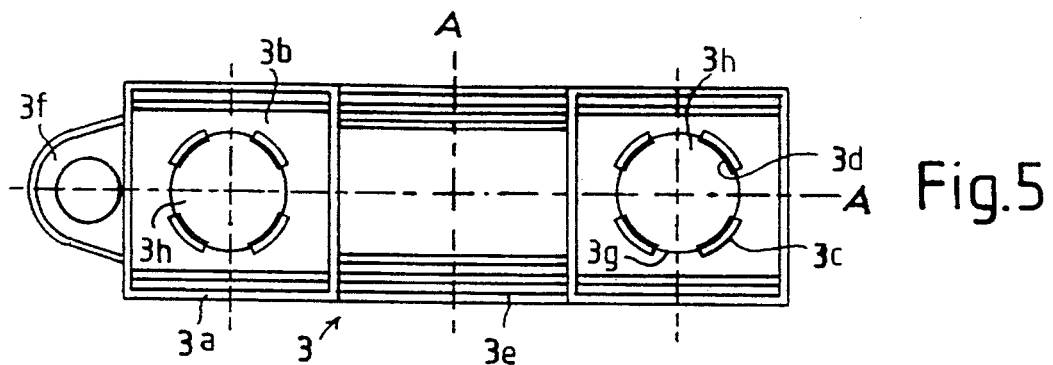
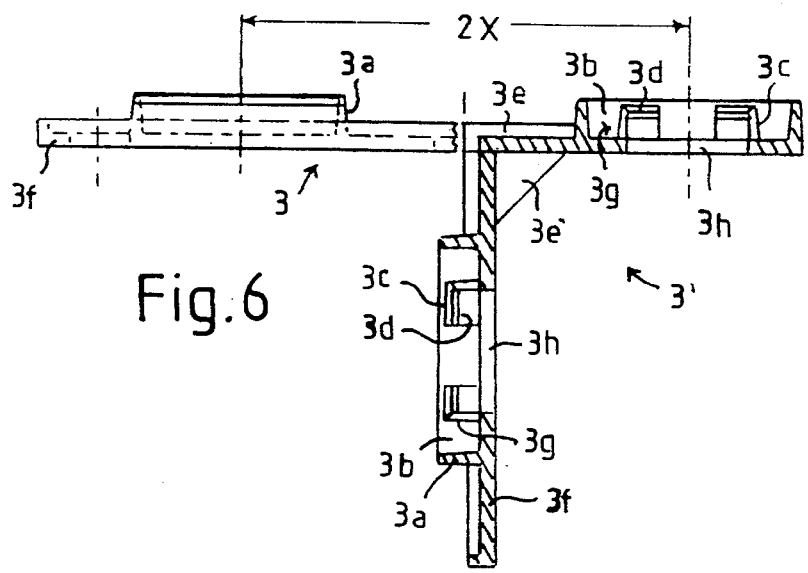
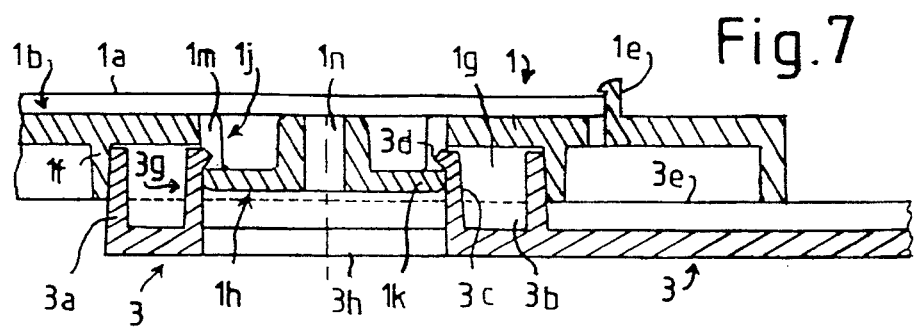

COMBINATION SYSTEM FOR HOLDING BOXED COMPACT DISKS

FIELD OF THE INVENTION invention pertains to a combination system of rectangular combination plates and linear connecting strips, for holding boxed compact disks. The plates are provided on their front side with angular projections for securing the compact disk boxes in position.

BACKGROUND OF THE INVENTION

A known system of this type consists of extruded, profiled plates that are screwed together using spacers to form larger structures. Each individual profiled plate is designed to hold a larger number of compact disk boxes (hereinafter called "CD boxes"). This system has a number of disadvantages. The profiled panel must be cut to proper length, trimmed, and drilled with screw holes. Manufacture of such a system is expensive and installation is laborious for the user. The large dimensions of the profiled panels limit the available combinations. When a storage case for a compact disk is in position, the hinged lid of the CD box cannot be opened. Removing the compact disk thus requires the storage case to be removed from its mounting on the panel and then returned to its position. The displayed storage cases have an appearance similar to a wall of a sales showroom, which is not decorative.

Another known system has narrow rails for display placed horizontally and spaced by vertical connecting strips. Here also, the finishing and assembly are complicated, and the combination possibilities are limited. Considering decorative value and disk removal, the previous mentioned deficiencies are valid.

SUMMARY OF THE INVENTION

The object of the invention is to provide a combination system for holding CD boxes which is universal, economical, and user-friendly, using the simplest means.

The invention consists in that on the reverse side of the combination plates, in the area of each side edge, there is at least one seat for connecting strips provided with seats which cooperate with the seats on the plates. Both the seats and the cooperating seats are shaped as mutually corresponding, resilient snap-in connections formed as protrusions and indentations.

Combination plates and connecting strips of this type can be manufactured from thermoplastic materials as finished items in an injection molding process. The seats or cooperating seats provided with resilient snap-in features and protruding from the combination plates and connecting strips allow simple handling and the production of versatile geometric or spatial combinations.

In accordance with another configuration of the initially described combination system according to this invention, a combination plate has on its front side a rectangular mount in area for plate-parallel holding of a CD box, and that along one perimeter side of the mounting area there is an open, angled projection for engaging with a hinged area of the CD box, while in the region of the perimeter side of the mounting area parallel to said angled projection, there is a snap-catch acting toward the middle of the plate for engaging with a protruding base rim of the CD box.

As a result of this spatial configuration, the cover of an installed CD-box can be opened, i.e., the box remains in the mounting area of the plate during removal of the disk.

BRIEF DESCRIPTION OF THE FIGURES

The figures present examples of the invention, and the description of the figures clearly shows the advantages attained and the additional invention properties, which are often significant on their own. The figures show:

FIG. 4, is a side elevational view of the plate of FIG. 2, with installed CD box;

FIG. 5, is a front view of a straight connecting strip;

FIG. 6, is a side view of FIG. 5 showing a cross section along A—A with simultaneous cut-away view of a 90° angled strip;

FIG. 7, is a cross section taken along B—B of FIG. 3;

DETAILED DESCRIPTION OF THE PREFERRED EMBODIMENTS

Figure 1:
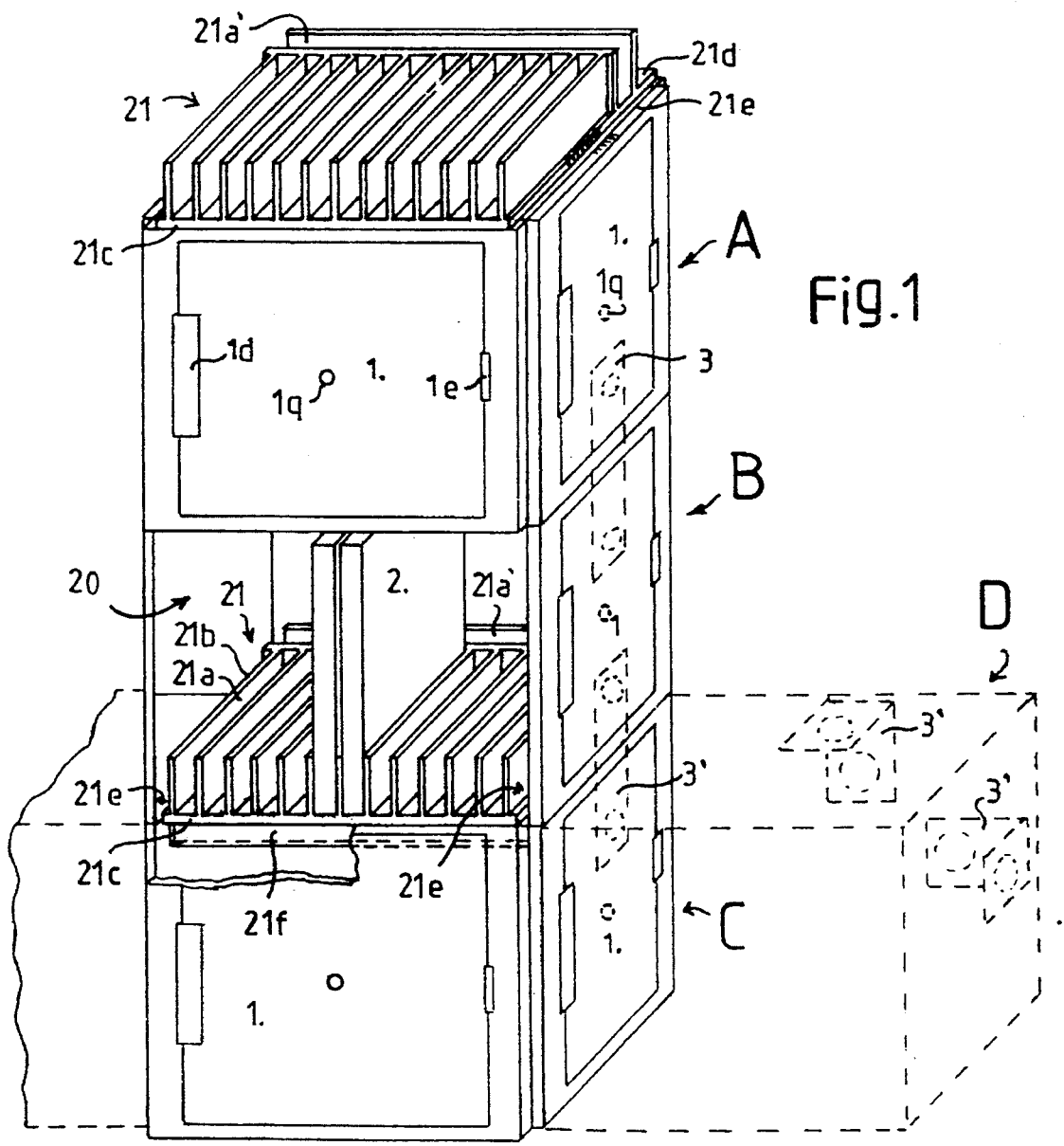
FIG. 1, is a schematic view of a three-dimensional combination of plates in conjunction with two magazines.

FIG. 1 shows a schematic view of a three-dimensional structure of combination plates 1. The structure is composed of rectangular units A–D. Each combination plate 1 is designed to hold one CD box 2 in the manner shown in FIGS. 2 and 4. As connecting means for the combination plate 1 or rectangular units A–D, straight and angled connected strips 3,3' are used. All these elements are described in greater detail based on the detailed FIGS. 2–7.

The rectangular, elongated combination plate 1 features a seat 1b on its front side surrounded by a strip-like frame 1a for one CD box 2. Parallel to the left side edge of plate 1c, an angled projection 1d opens up for engagement with a hinged area 2a of the CD box 2. The combination plate 1 has lower angled projections 1e for engaging in the corresponding region of the slightly protruding base edge 2b of the CD box 2; these angled projections run parallel to the angled projections 1d and are on an opposite side of frame 1a; 1r denotes a frame-like structure.

The reverse side of the combination plate 1 is divided into equally sized seats 1g for connecting strips 3,3' by means of projecting edges 1f. These strips likewise feature cooperating seats 3b formed by edges 3a, that is, they engage in the seats 1g, when the strip connection (FIGS. 3 and 7) is produced. Centered in its seat 1g the combination plate 1 has protruding hollow pins 1h whose side walls 1j feature diametrically opposing snap-in recesses 1m beneath the front wall 1k. Strips 3,3' having cooperating seats 3b are provided with opposing, resilient snap-in catches 3c formed by hollow pins 3g that cooperate with the diametrically opposing snap-in recesses. These snap-in catches 3c have protruding edges 3d that run beneath the front walls of the hollow pins 1k within the snap-in recesses 1m.

Between the cooperating seats 3b there are connecting strips 3,3' with stabilizing, elongated ribs 3e,3e' which run above the seat ribs 1f when the strips are connected. The size of the snap-in catches 3c allows a gentle snapping in and out with an excellent snap action. Snapping out is easily accomplished by hand owing to the underlying strip extension 3f, on a lower side thereof.

The connecting strips 3,3' also feature centered openings 3h within their cooperating seats 3b.

The hollows pins 1h of the combination plate 1 are provided with central insertion holes 1n in which a catch cord 4 (FIG. 3) can be attached by means of elastic insertion pins; the attachment can also be implemented as a bridge between neighboring combination plates 1 of a combination. The strip leads 3h allow the catch cord 4 to be inserted into insertion holes in of these seats 1g, which are occupied by a connecting strip 3 or 3'.

Figure 3:
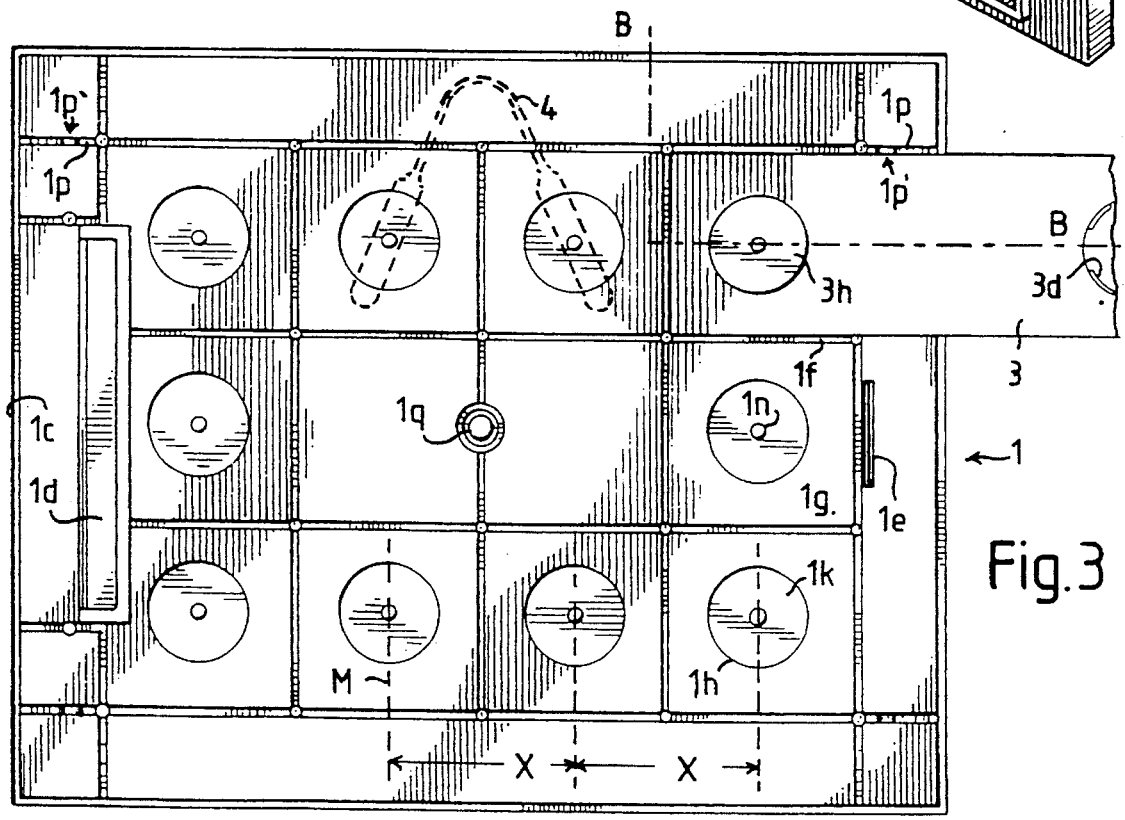
FIG. 3, is a top plan reverse side of view of the combination plate of FIG. 2.

From FIGS. 3 and 4, it can be seen that the rib regions 1p protruding from the corner regions of the combination plate 1 are elevated to form spacer feet. The spacer feet are provided with recesses 1p'. In the case of several combination plates being 1 stacked into a single sales unit, the strip-like frame 1a of the seat 1b of the lower combination plate 1 is held in a foot recess of the combination plate 1 above it. Thus, the plates are secured in position relative to each other.

Seats 1g placed in a row have a spacing of nX measured from central line to central line M, where n is a whole number. In addition, seats 1g and the cooperating seats 3b are of symmetrical function so that a combination of strip 3,3' can be placed in two mutually perpendicular directions, especially in the corner regions of the combination plate 1.

Thus, the combination plates 1 can be joined together in the horizontal and perpendicular direction in an exceptionally versatile manner, i.e., in a straight line and offset by a variable spacing nX of the seats 1g.

Manipulation of the CD box and of the compact disk is exceptionally simply and easy.

A CD box 2 is first pushed by its hinged region 2a on a slant under the angled projection 1d, and then it is snapped into the seat 1b. Due to the snap-in catches 1e above the edge 2b of the base of the box, the box cover 2c can be opened and the compact disk 5 removed without having to remove the CD box itself. However, if the CD box 2 is to be removed or replaced with another one, then it will be pushed somewhat to the left against the resilient angled projection 1d and tipped to the right out of the seat 1b.

Naturally, a combination plate can also be equipped with several side by side and/or stacked seats 1b in a larger configuration. However, this produces larger combinations.

As is also indicated in FIG. 1, in a box-shaped unit B, the placement of the corresponding combination plate on the front side is omitted, so that an accessible space 20 is created. A magazine plate 21 is located in the bottom of this space; it is provided with parallel insertion channels 21a formed by ribs 21b.

The top, rectangular unit A is covered on top by the same magazine plate 21. The entire width of the magazine plate 21 rests along its edge 21c against edges of the combination plates 1; the rear corner regions have protruding edges 21d on the reverse that rest against the edges of the combination plates. The width and depth of the magazine plate 21 is sized so that between then and the combination plates 1, spacer slots remain on the right, left and rear for vertical positioned connecting strips 3, which in turn connect stacked, rectangular units B, C with each other. The lateral spacer slots are denoted as 21e, so that the rear slot extending between the arms 21d is covered.

For the purpose of horizontal placement of the magazine plates 21, these plates 21 have downward protruding bars 21f extending into the particular rectangular units A, C.

The entire surface of the magazine plate 21 is utilized with a rear, transverse running insertion channel 21a'. However, this is used only when the magazine plate 21 is used as cover.

Two CD boxes 2 are placed in the insertion channels 21a. In this manner regions of any size can be used for additional housing of CD boxes. In addition, it is possible to provide the magazine plate 21 with thinner insertion channels so that a significantly greater number of foil-like boxes with packed compact disks can be inserted into the space 20.

At least one magazine plate could be placed upright in the space 20 for horizontal storage of CD boxes.

Figure 8:
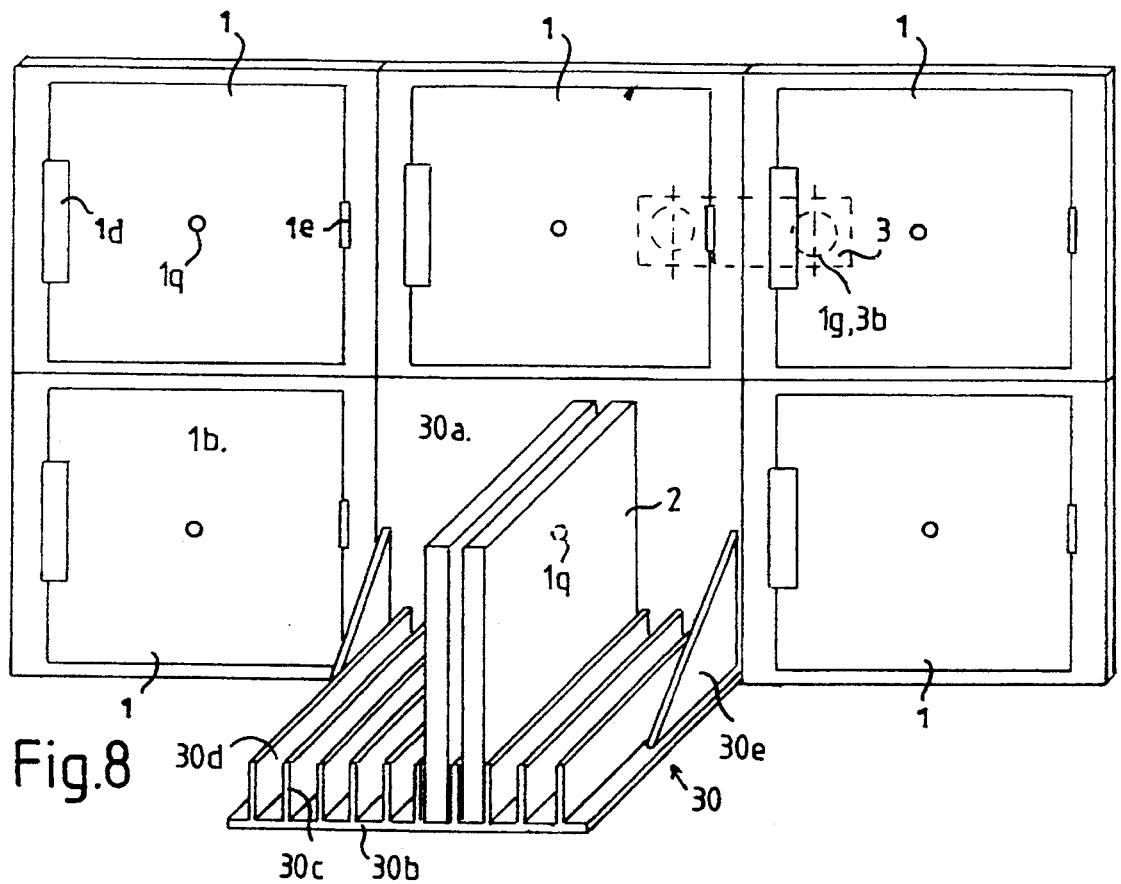
FIG. 8, is a front elevational view of a plane combination of plates and strips with an inserted, angled magazine shown in schematic perspective view.

FIG. 8 shows a schematic view of a flat combination of five combination plates 1 placed against a wall. These plates are designed in the manner described above. Thus, on the front side they have a seat 1b for one CD box and for positional mounting, the CD box area has an angled projection 1d and a catch 1e. The reverse strip connections are covered. One of these connections formed by two seats 1g and a straight connecting strip 3 with its cooperating seat 3b, is indicated by dashed lines.

An angled box magazine 30 is placed in the middle of the lower row. The rear, upright magazine leg 30a has the same size as a combination plate 1; its reverse being provided in the same way with seats 1g for connecting strips 3 (which are covered, and are not illustrated) and inserted by them into the combination as a type of combination plate 1. The horizontal magazine leg 30b has insertion channels 30d formed by parallel ribs 30c for CD boxes. The plates 30e are provided a as a type of node plate and are used to reinforce the angled magazine.

Figure 2:
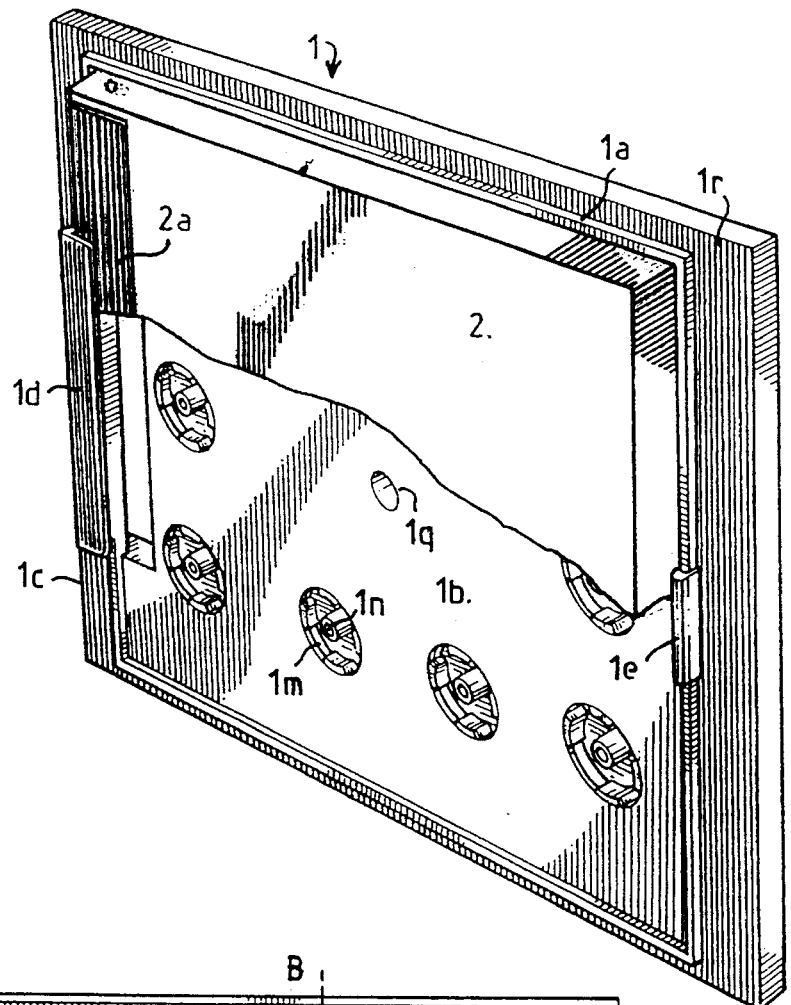
FIG. 2, is a combination plate shown in perspective view, with a CD box in position therein.

Since the weight of a larger flat combination, in particular one with built-in angled magazines, will exceed the tensile strength of a catch cord 4 (FIG. 3), both the combination plate 1 and the upright leg 30a of the angled magazine 30 have centrally located screw transit holes 1q (see also FIGS. 2–4). Since the combination or a portion thereof is mounted initially by a catch cord 4, most of the required drilled dowel holes can be easily placed in the wall.

Figure 9:
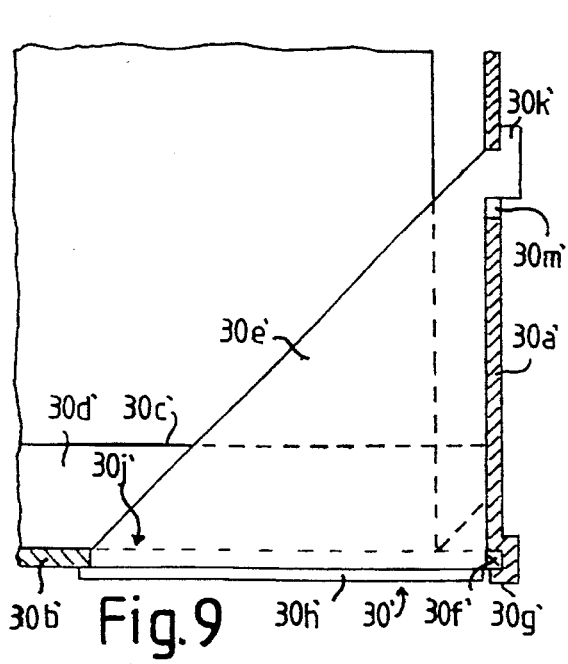
FIG. 9 is a cross section along the plane of a node plate according to FIG. 8 with a multipart, angular magazine.

Based on a schematic, cut-away drawing, FIG. 9 shows that the angled magazine 30' can be produced as a structural set to obtain a low-cost shipping package, where the individual, flat parts can be assembled by the user. These parts consist of plate 30b' having the insertion channels 30d' forming the extending horizontal magazine leg, the plate 30a' forming the rear, upright magazine leg, and the two node plates 30e'. The rear edge 30f of the horizontal plate 30b' is braced against a protruding edge bar 30g' of the vertical plate 30a'. The lower node plate 30e' provided with contact edge 30h' extends through mounting slots 30j' of the horizontal plate 30b' and its upper, hook-like protrusions 30k' extend through openings 30m' of the upright plate 30a' and engage with it. This embodiment example represents a particularly excellent shipping and user-friendly design, since the individual parts take up minimum space and can be assembled very easily. Naturally it would be possible to manufacture the node plate 30e' of the horizontal plate 30b' directly.

Figure 11:
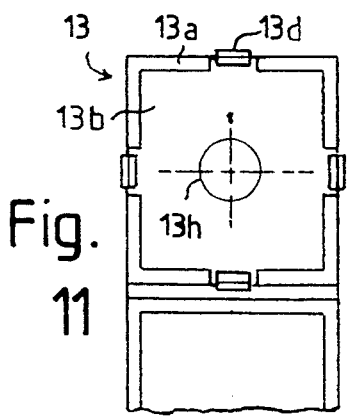
FIG. 11, is a front view of a portion of the connecting strip in FIG. 10.
Figure 10:
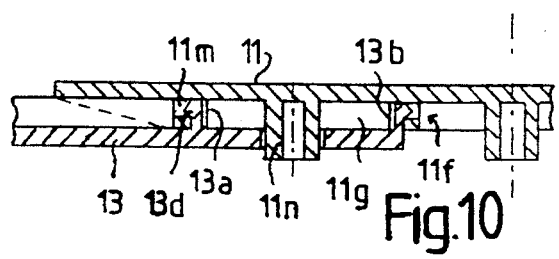
FIG. 10, is a cross section through a connecting site between a plate and a connecting strip using alternative snap-in means.

Based on FIGS. 10 and 11, we also see that the snap-in means acting between the combination plate 1 (or the magazine plate 21 or angled magazines 30, respectively) on the one hand and the connecting strip 3,3' on the other hand, can have alternative designs. In this case, they are provided on the ribs 11f forming the seats 11g of the combination plate 11, and the ribs 13a forming the cooperating seats 13b of the connecting strip 13. The seat ribs 11f of the combination plate 11 feature the snap-in recesses 11m, and the snap-in protrusions 13d of the ribs 13a forming the cooperating seats 13b engage in them in a resilient manner. For the purpose of attaching a catch cord 4 (see FIG. 3) the seats 11g of the combination plate 11 are provided with drilled insertion holes 11n and the cooperating seats 13b of the connecting strip 13 are provided with drilled holes 13h.

We claim:

1. A combination system for holding boxed compact discs (2) comprising a plurality of rectangular combination plates (1) and linear connecting strips (3), the combination plates (1) each being provided on a front side thereof with angular projections (1d, 1e) for securing a compact disc box (2) in position, wherein on a reverse side of each combination plate (1), in a region of each side edge, at least one seat (1g) is provided for connecting a strip (3,3') provided with cooperating seats (3b), and the seats (1g) and the cooperating seats (3b) are shaped as mutually corresponding, resilient snap-in connections that form snap-in means having protrusions and indentations (3d, 1m), wherein a said combination plate (1) has on said front side thereof a rectangular mounting area (1b) for holding the compact disc box (2) thereon, and one shorter perimeter side of said rectangular mounting area comprises an open angled projection (1d) for engaging with a hinged area (2a) of the compact disc box (2), and an opposite shorter perimeter side of said mounting area parallel to said angled projection (1d), comprises a snap-catch (1e) for engaging with a protruding base rim (2b) of the compact disc box (2), and wherein said open angled projection (1d) is shorter in length than said shorter perimeter side of said mounting area, thereby enabling the compact disc to be removed from the compact box without removing the compact disc box from the mounting area.

2. Combination system according to claim 1, characterized in that the connecting strips comprise angled connecting strips (3') for combining with the combination plates (1) to form three-dimensional structures.

3. Combination system according to claim 1, characterized in that the combination plate (1) comprises a plurality of seats (1g) per side edge, said seats (1g) having a mutual spacing of nX, where n is a whole number.

4. Combination system according to claim 1, characterized in that the seats (11g) and the cooperating seats (13b) are surrounded by edges (11f and 13a) which comprise front and rear protrusions (13d and 11m) of the resilient snap-in connections.

5. Combination system according to claim 1, characterized in that the seats (1g) and the cooperating seats (3b) are surrounded by edges (1f and 3a) and are provided on a perimeter thereof with protrusions (1h, 3g) in the form of hollow pins that engage with each other; said pins being provided with snap-in features comprising protrusions and recesses (3d and 1m), wherein bottom pin protrusions comprise at least in part, resilient segments (3c).

6. Combination system according to claim 1, characterized in that spacer feet (1p) are formed at the rear edge regions of the combination plate (1) said spacer feet being provided with stacking recesses (1p').

7. Combination system according to claim 1, comprising a combination unit (B) which includes at least one rectangular combination plate (1) joined together at right angles to form a laterally accessible chamber (20), and in at least in one of the planes surrounding this chamber and extending vertically to an opening of the chamber (20), a magazine plate (21) is provided with mutually parallel insertion channels (21a) for placement of additional compact disc boxes (2).

8. Combination system according to claim 7, characterized by a magazine plate (21) placed as a horizontal spacer or covering element for the rectangular combination; said magazine plate being dimensioned so that spacer slots (21e) for passage of connecting strips (3) remain available between said magazine plate and the rectangular combination plates (1) of associated adjacent rectangular combination units (A-C).

9. Combination system according to claim 1, comprising an angular magazine (30) for insertion into a flat group of combination plates (1), wherein a magazine leg (30b) is provided on an inside of an angle with parallel insertion channels (30d) for compact disc boxes (2), while another magazine leg (30a) is sized as a combination plate (1) and is equipped on a backpanel thereof with seats (1g) for connecting strips (3).

10. Combination system according to claim 9, characterized in that the two magazine legs (30a,30b) are parts of separate components joined together by a user.

* * * * *